United States Patent [19]

Lind

[11] Patent Number: 4,473,237
[45] Date of Patent: Sep. 25, 1984

[54] VEHICLE LIFT AND TOW BAR

[76] Inventor: Per G. Lind, Box 13092, 58013 Linkoping, Sweden

[21] Appl. No.: 433,376

[22] Filed: Oct. 8, 1982

[51] Int. Cl.³ .............................................. B60P 3/06
[52] U.S. Cl. .................................... 280/402; 414/563
[58] Field of Search ................. 280/402, 418; 414/563

[56] References Cited

U.S. PATENT DOCUMENTS 4,264,262  4/1981  LoCodo ........................... 280/402 X

FOREIGN PATENT DOCUMENTS 986155  3/1976  Canada ................................. 280/402
1407262  9/1975  United Kingdom ................ 280/402

Primary Examiner—John A. Pekar
Attorney, Agent, or Firm—Hayes, Davis & Soloway

[57] ABSTRACT

A hydraulic vehicle lift and tow bar mounted at the rear of a tow truck which has a beam supporting two frames that are placed under a pair of wheels of the vehicle to be towed. A hydraulic cylinder raises the beam to lift the towed vehicle. The frames are pivotedly mounted to allow turning during towing and to permit them to be folded back against the beam during storage. The beam telescopes to reduce the distance it protrudes behind the truck when not in use.

4 Claims, 3 Drawing Figures

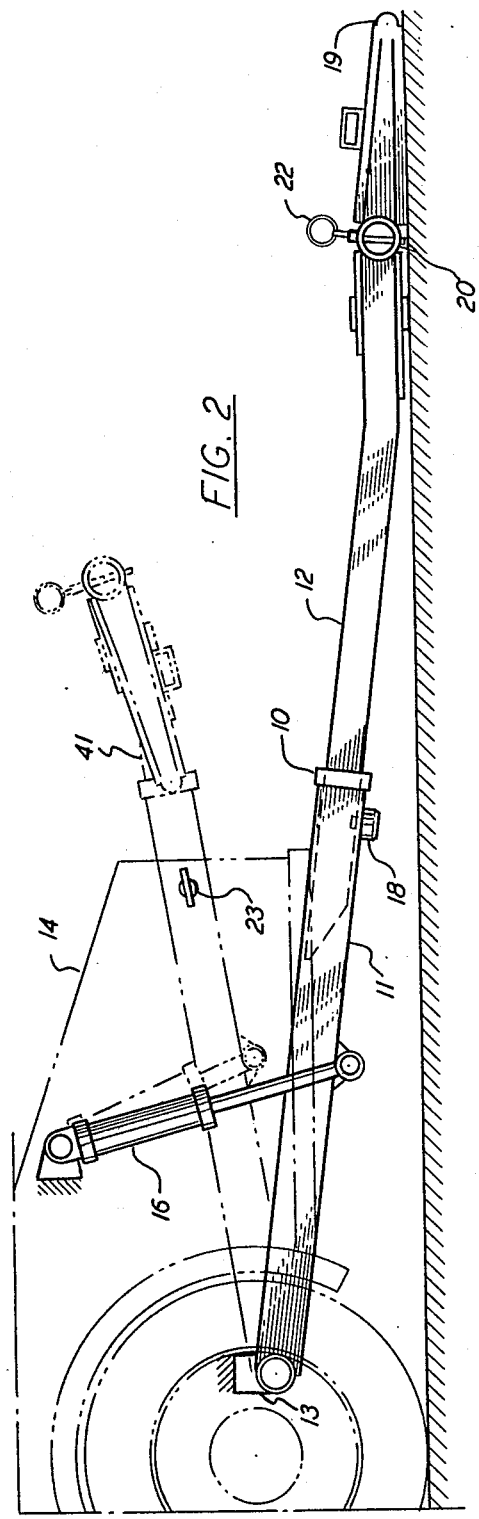
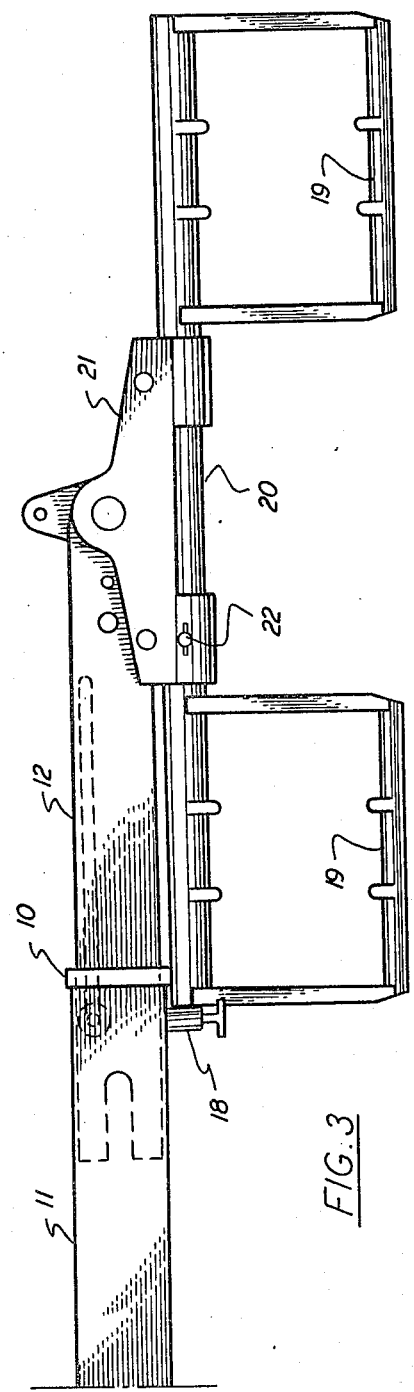
FIG. 2
FIG. 3

VEHICLE LIFT AND TOW BAR

The present invention is a hydraulic vehicle lift and tow bar for a tow truck.

As presently designed, most tow trucks require somewhat awkward handling and positioning to affix the vehicle to be towed to the truck and lift one end of it from the ground. Generally, a hoist must be attached to the vehicle to lift it up and the towing bar is attached in some manner to the axis of the vehicle. Usually the towing bar of fixed length is pivotedly mounted to the tow truck and folded upwardly when not in use.

The present invention proposes a lift and tow bar that much simplifies the work of the operator to engage the vehicle to be towed. Generally, the device of this invention comprises frames that can be slid under the wheels of the vehicle to be towed, or alternatively the vehicle to be towed can be pulled thereon. These frames are attached to a beam or tow bar which is raised hydraulically by the tow vehicle to lift the wheels of the towed vehicle and place the towed vehicle in a position to be towed. Nothing more is required. The operation to engage and lift the towed vehicle is quite simple and straight forward, and can be done quite rapidly.

In brief compass, the present invention is a vehicle lift and tow bar which consists of a telescoping beam having at the outer end a wheel carrier to engage the wheels of a vehicle to be towed. The other end of the telescoping beam is attached to the underside of the frame of the towing vehicle or truck and is adapted to be raised and lowered hydraulically. The wheel carrier is pivotedly mounted at the outer end of the telescoping arm of the telescoping beam for rotation in a horizontal plane and the two frames that engage the wheels of the towed vehicle are pivotedly mounted to rotate in vertical planes from a forward locked use position to a position approximately 180° therefrom for storage. This pivotal mounting permits the wheel carrier to be folded back against the telescoping beam with the wheel carrier frames thereover and the beam retracted so that the lift and tow bar does not protrude excessively from the rear of the towing vehicle when not in use.

In use, the tow truck is positioned in front of the pair of wheels of the vehicle to be towed with the lift and tow bar in the lowered position and with the wheel engaging frames in their use position. The towing vehicle is then backed up to push the frames under the wheels of the vehicle to be towed. Alternatively, the towing vehicle can have a winch and cable which can be used to pull the towed vehicle up on to the frames and to hold the towed vehicle in position during travel.

DRAWINGS

In the drawings:

FIG. 2 is an elevation view; and,

FIG. 3 is another plan view showing the wheel carrier in its folded position ready for the wheel carrying frames to be folded over the telescoping beam.

DESCRIPTION

Figure 1:
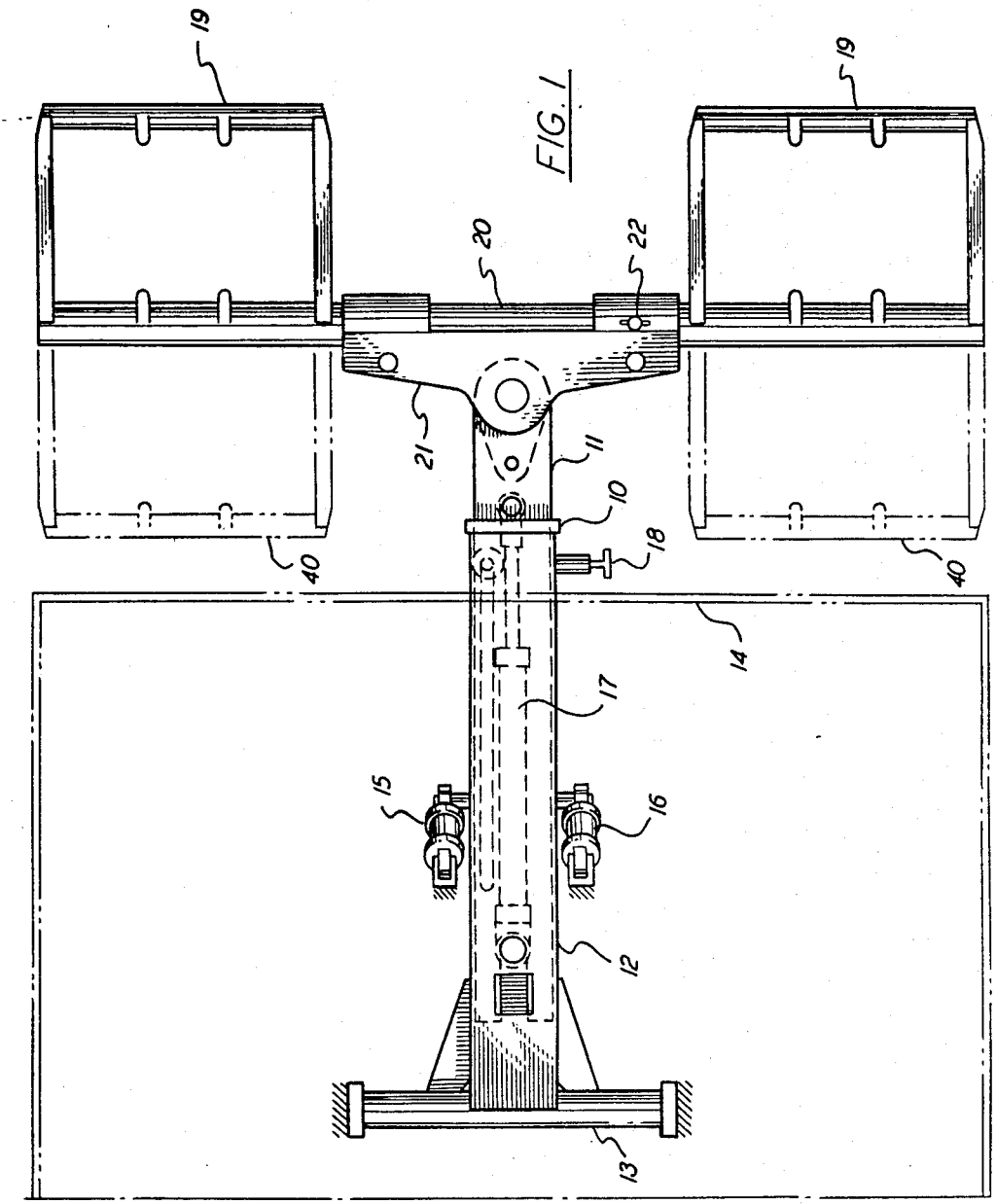
FIG. 1 is a plan view of the lift and tow bar of this invention with its position relative to the towing truck indicated by a shadow outline of the truck.

In the drawings, a telescoping beam is generally indicated at 10 which beam has an outer casing 11 in which an arm 12 slides in and out. The casing and arm are preferably rectangular in cross section for reasons of strength and orientation. The end of the casing is attached by a pivotal mounting 13 to the frame of a tow truck, preferably at axle height. The rear end of the tow truck is indicated by shadow outline 14. The beam 10 is capable of being lifted and lowered hydraulically by hydraulic pistons 15 and 16. It can be pinned in the raised storage and/or tow position by pin or latch 23 extending through the beam and into the frame of the truck.

Inner arm 12 ends in a pivoted mounting 21 adapted to rotate generally in a horizontal plane. The outer end of arm 12 is preferably bent as shown to be generally parallel to the ground. Mounting 21 carries an axle or rod 20 to which are attached wheel carrying frames 19. The frames in use are in the position shown by the solid lines in FIG. 1 and when retracted to the storage position are in the position shown by the shadow outlines 40. Pin or latch 22 is used to lock the frames in either position which are approximately 180° apart.

Inner arm 12 telescopes into outer casing 11 and while this can be done manually with inner arm 12 being locked into position by means of latch 18, this reciprocating action is preferably accomplished via a hydraulic cylinder 17 within the beam with latch 18 being used to lock the beam in either its extended or retracted positions so as to obviate the need to keep pressure in hydraulic cylinder 17.

As shown in FIG. 3, the wheel carrier can be rotated 90° out of its use position so that the axis of axle 20 and the longitudinal axis of beam 10 are parallel. The wheel carriers 19 can when positioned as shown in FIGS. 1 and 2 be turned up over beam 10 for storage and the beam can be raised by hydraulic cylinder 15 and 16 and locked in the position shown by the shadow outlines 41 in FIG. 1 with latch 23 being used to retain it in that position to relieve the load on hydraulic cylinder 16.

To use the lift and tow bar, the tow truck is positioned in front of the vehicle to be towed so that the wheel frames 19 will be aligned with the front or rear pair of wheels of the vehicle to be towed. Beam 10 is lowered by means of hydraulic cylinders 15 and 16, mounting 21 is rotated to place the frames in line with the towed vehicle's wheels, the frames 19 are flipped over to the use position from their closed position and hydraulic cylinder 17 is operated to extend inner arm 12. If the positioning is proper, the action of hydraulic cylinder 17 can drive frames 19 under the wheels of the vehicle to be towed. If this is not sufficient, truck 14 may be backed to push frames 19 under the wheels or a winch and cable on truck 14 can be used to pull the towed vehicle up onto the frames 19.

Having positioned the wheels of the vehicle to be towed on frame 19, hydraulic cylinders 15 and 16 raise beam 10 so that the wheels of the vehicle to be towed are raised into a towing position. Latch 23 may be used to lock beam 10 to the frame of the vehicle so that the cylinders 15 and 16 do not have to be kept under pressure.

What is claimed is:

1. A vehicle lift and tow bar comprising in combination:
   (a) a telescoping beam having an outer casing and an inner arm reciprocating therein;
   (b) first mounting means for pivotedly attaching for up and down motion of said telescoping beam one end of said outer casing under and to the frame of a truck with said inner arm directed towards the rear of said truck beyond the end thereof;

(c) a hydraulic cylinder attached to said outer casing and in use to said frame for effecting said up and down motion;

(d) second mounting means pivotedly connected to the outer end of said inner arm for rotation in a generally horizontal plane; and (e) a wheel carrier pivotedly mounted by said second mounting means, said wheel carrier having two spaced apart frames adapted to engage from the underside a pair of wheels of a vehicle and lift the same, said pair of frames being pivotedly mounted to said second mounting means for rotation about a first axis generally horizontal and perpendicular to the longitudinal axis of said inner arm when in the use position, said pivotal mounting permitting rotation of said pair of frames from a position extending beyond the outer end of said inner arm to a position alongside said outer end.

2. The lift and tow bar of claim 1 wherein means are provided for locking said pair of frames in a locked extended position generally horizontal to the ground, said locking means, when released permitting rotation of said pair of frames to a retracted position approximately 180° therefrom.

3. The lift and tow bar of claim 1 wherein said second mounting means extends beyond the outer end of the inner arm by a sufficient amount to permit at least 90° rotation of said wheel carrier such that said wheel carrier can be rotated from the use position to a folded position with said first axis and said longitudinal axis being generally parallel.

4. The lift and tow bar of claim 1 including means for locking said telescoping beam to said frame when said telescoping beam is in its elevated and tow position whereby hydraulic perssure need not be maintained during towing.

* * * * *